US012778730B2

(12) United States Patent
Jeppesen

(10) Patent No.: US 12,778,730 B2
(45) Date of Patent: Nov. 3, 2026

(54) CURING SYSTEM AND METHOD

(71) Applicant: Prospedent LLC, Omaha, NE (US)

(72) Inventor: Palmer Corbin Jeppesen, Omaha, NE (US)

(73) Assignee: PROSPEDENT, LLC, Omaha, NE (US)

( * ) Notice: Subject to any disclaimer, the term of this patent is extended or adjusted under 35 U.S.C. 154(b) by 203 days.

(21) Appl. No.: 18/434,512

(22) Filed: Feb. 6, 2024

(65) Prior Publication Data

US 2024/0261075 A1 Aug. 8, 2024

Related U.S. Application Data

(60) Provisional application No. 63/443,626, filed on Feb. 6, 2023.

(51) Int. Cl.
*A61C 13/15* (2006.01)
*A61C 5/30* (2017.01)

(52) U.S. Cl.
CPC .............. *A61C 19/004* (2013.01); *A61C 5/30* (2017.02)

(58) Field of Classification Search
CPC ................................ A61C 19/004; A61C 5/30
USPC ............................................................ 433/29
See application file for complete search history.

(56) References Cited

U.S. PATENT DOCUMENTS 6,193,510 B1 * 2/2001 Tsimerman .......... A61C 1/0015 433/29
6,331,111 B1 * 12/2001 Cao .................... B23K 26/0096 433/29
6,893,258 B1 * 5/2005 Kert ..................... A61C 19/004 433/29
7,029,277 B2 4/2006 Gofman et al.
7,192,276 B2 * 3/2007 Fischer ................ A61C 19/004 433/29
7,229,200 B1 * 6/2007 Bender ................ A61C 19/004 433/29

(Continued)

FOREIGN PATENT DOCUMENTS

WO WO-0164129 A1 * 9/2001 ........... A61C 19/004
WO WO-2007096824 A2 * 8/2007 ........... A61C 19/004

OTHER PUBLICATIONS

Rueggeberg, et al. "Light curing in dentistry and clinical implications: a literature review."

*Primary Examiner* — Matthew M Nelson
(74) *Attorney, Agent, or Firm* — Kutak Rock LLP; Ryan S. Hinderliter

(57) ABSTRACT

A curing system and method are provided for effective, adjustable, and efficient curing of medical grade resins. In an embodiment, the curing system comprises an elongated handheld wand device having a handle end opposite a curing end. The distal, curing end of the wand comprises a power transferable, magnetic connector positioned in an orientation substantially perpendicular to the longitudinal axis of the wand. Such power transferable, magnetic connector of the wand is configured for attachment and selective engagement with a corresponding power transferable, magnetic connector positioned on a curing light attachment piece. In an embodiment, the curing system includes one or more selectively deployable curing light attachment pieces, such as a quadrant curing light attachment and a crown curing light attachment. In an embodiment, the curing system further includes a charging dock station.

20 Claims, 15 Drawing Sheets

(56) References Cited

U.S. PATENT DOCUMENTS

| | | | | |
|---|---|---|---|---|
| 7,989,839 | B2 | 8/2011 | Dahm | |
| 10,881,491 | B2 | 1/2021 | Tommasini et al. | |
| 2002/0151941 | A1* | 10/2002 | Okawa | A61B 90/36 607/99 |
| 2003/0001507 | A1* | 1/2003 | Cao | B23K 26/0096 315/56 |
| 2003/0215766 | A1* | 11/2003 | Fischer | G02B 3/04 433/29 |
| 2004/0121280 | A1* | 6/2004 | Fischer | A61C 19/004 433/29 |
| 2005/0042570 | A1* | 2/2005 | Fischer | A61C 19/004 433/29 |
| 2005/0136372 | A1* | 6/2005 | Fischer | A61C 19/004 433/29 |
| 2006/0024638 | A1* | 2/2006 | Rosenblood | A61K 6/884 433/29 |
| 2006/0188835 | A1* | 8/2006 | Nagel | A61C 19/004 433/29 |
| 2006/0275732 | A1* | 12/2006 | Cao | A61C 19/004 433/29 |
| 2007/0020578 | A1* | 1/2007 | Scott | A61C 19/004 433/29 |
| 2007/0105063 | A1* | 5/2007 | Pinyayev | A61N 5/0603 433/29 |
| 2007/0121786 | A1* | 5/2007 | Okawa | A61B 1/0615 378/65 |
| 2007/0190479 | A1* | 8/2007 | Jackson, III | A61C 19/004 433/29 |
| 2009/0208894 | A1* | 8/2009 | Orloff | A61C 19/004 433/29 |
| 2010/0216089 | A1* | 8/2010 | Cao | F21V 29/70 433/29 |
| 2011/0141733 | A1* | 6/2011 | Senn | A61C 19/004 362/235 |
| 2011/0300505 | A1* | 12/2011 | Jessop | A61C 19/003 433/29 |
| 2013/0052607 | A1* | 2/2013 | Gersh | A61C 19/004 433/27 |
| 2013/0344454 | A1* | 12/2013 | Nath | A61N 5/0613 607/90 |
| 2016/0008115 | A1* | 1/2016 | Senn | A61B 1/24 433/29 |
| 2017/0056130 | A1* | 3/2017 | Cannon | A61C 19/004 |
| 2017/0258566 | A1* | 9/2017 | Gill | H05B 45/3725 |
| 2019/0046812 | A1* | 2/2019 | Harlan | A61C 19/004 |
| 2019/0201176 | A1* | 7/2019 | Peterson | A61C 19/004 |
| 2019/0247147 | A1* | 8/2019 | Grande | A61C 7/02 |
| 2021/0196436 | A1* | 7/2021 | Raby | B29C 64/00 |
| 2021/0401559 | A1* | 12/2021 | Peterson | A61C 19/003 |
| 2022/0107076 | A1 | 4/2022 | Stone et al. | |
| 2022/0249215 | A1* | 8/2022 | Zhang | F16C 17/18 |
| 2022/0273399 | A1* | 9/2022 | Lin | A61N 5/0603 |
| 2022/0273410 | A1* | 9/2022 | Cao | A61C 19/004 |
| 2022/0331080 | A1* | 10/2022 | Shih | G02B 27/30 |
| 2022/0401201 | A1* | 12/2022 | Jessop | A61C 19/04 |
| 2025/0032235 | A1* | 1/2025 | Addison | A61C 19/004 |

* cited by examiner

CURING SYSTEM AND METHOD

CROSS-REFERENCE TO RELATED APPLICATIONS

This application claims priority pursuant to 35 U.S.C. 119(e) to U.S. Provisional Patent Application Ser. No. 63/443,626, filed Feb. 6, 2023, the entire disclosure of which is incorporated herein by reference.

FIELD OF THE INVENTION

The present invention relates generally to curing devices and methods. More specifically, the present invention is concerned with a curing system configured for selective emission of light waves of a wavelength and intensity to cure resins such as dental composites with an increased and adjustable curing area.

BACKGROUND OF THE INVENTION

Many common dental and medical procedures utilize medical grade resins, which harden when cured, to adhere to and/or fill one or more cavities in a patient's tooth tissue, bone tissue, or alternative body part. Typically, light and/or heat are used to cure such resins. For example, in most dental filling procedures today, a dentist utilizes a composite resin to fill a cavity formed after removal of decayed tooth tissue. Such composite resins are generally applied in liquid form and then cured with the application of light, which creates a reaction causing the resin to harden to form a solid filling. Nevertheless, currently available devices for curing resin fillings are tedious to use and inefficient. Accordingly, it would be beneficial to have a curing device which is user friendly and allows for efficient curing of resins.

Currently available dental curing lights are generally composed of a single light-emitting diode (LED) collimating lens and have an industry average diameter of merely 10 millimeters. The largest lens for a dental curing light currently on the market is 12 millimeters in diameter. Such curing light designs limit the effective curing area to only what can fit within the diameter of emitted light, which is roughly equivalent to one tooth at a time. Accordingly, it would be beneficial to have a curing device with a larger curing area.

In the practice of dentistry today, it is typical for dentists to conduct all filling procedures needed in one quadrant of a patient's mouth during the same appointment. Such practice is commonly referred to as quadrant dentistry. Each resin filling typically requires three separate cures: a first, 10-second cure after application of a bonding agent; a second, 20-second cure after the placement of a liner or base; and a third, 20-second cure after placement of a packable composite. Accordingly, each filling requires at least 50 seconds of curing time. In a typical case where three to six fillings within a single quadrant of a patient's mouth are conducted at one time, this means that 150-300 seconds, or two and a half to five minutes, are required just for curing with a curing area that only spans one tooth at a time. Over time, this leads to substantial lost production for a dentist. This problem of lost production time for curing is exponentially worse for orthodontists who require 30 seconds of cure time per bracket. For a patient with 28 teeth, that is equivalent to 14 minutes of cure time alone, which can easily add up to hours of lost production every week. Accordingly, it would be beneficial to have a curing device which lowers overall curing time.

Additionally, for a resin filling to be fully and properly cured, the clinician performing the procedure and the curing device used must provide the proper wavelength of light and sufficient beam intensity for a sufficient period of time. The clinician is responsible for achieving the proper distance and position of curing light beam and for maintaining such positioning throughout the cure. If any one of the wavelength of light, beam intensity, and/or time of application is compromised by either the clinician or the device, the cure itself is compromised and likely will result in early failure of the restoration. With standard curing devices having only 10 mm of effective curing area to work with, there is significant risk of error by the clinician while curing. Accordingly, it would be beneficial to have a curing device which provides a larger curing area to reduce the risk of clinician error in curing device positioning relative to a resin filling.

Heretofore there has not been available a device or method for curing resins with the advantages and features of the present invention.

SUMMARY OF THE INVENTION

The present invention comprises a curing system and method. In an exemplary embodiment, the curing system of the present invention is configured to provide and direct a light beam of a desired wavelength and intensity in a desired direction for effective and efficient curing. In embodiments, the curing system provides a curing light of a sufficient wavelength and intensity to cure medical grade resins. In an exemplary embodiment, the curing system of the present invention provides a light beam sufficient for curing dental resin composites, such as but not limited to for dental filling procedures. In a preferred embodiment, the curing system of the present invention provides a curing light beam covering a larger surface area than conventional curing lights. In embodiments, the present curing system allows for curing resin composites on four or five posterior teeth at once, which accommodates effective use in accordance with modern quadrant dentistry practices.

In an exemplary embodiment of the present invention, the curing system comprises an elongated handheld wand device having a handle end opposite a curing light attachment end. In an embodiment, the elongated wand includes a power button positioned along the length of the wand between the two ends and configured for turning on and off power to the curing light attachment end. In some embodiments the handheld wand further includes one or more adjustment buttons and/or a display screen. In some embodiments, the wand includes an internal microprocessor programmed for controlling parameters of the curing system, such as but not limited to light intensity and/or illumination time, adjustable by a user via the adjustable button(s) and/or display.

In an exemplary embodiment, the distal, curing light attachment end of the wand comprises a power transferable, magnetic connector positioned in an orientation substantially perpendicular to the longitudinal axis of the wand. In an exemplary embodiment, such power transferable, magnetic connector of the wand is configured for attachment and selective engagement with a corresponding power transferable, magnetic connector positioned on a proximal end of a curing light attachment piece.

In an exemplary embodiment, the curing system of the present invention includes multiple, selectively deployable curing light attachment pieces. In one embodiment, the curing system includes a quadrant curing light attachment. In another embodiment, the curing system includes a crown curing light attachment. In a further embodiment, the curing system includes a single curing light attachment.

In an exemplary embodiment of a quadrant curing light attachment of the present invention, a single attachment comprising four connected light-emitting diode (LED) collimating lenses is utilized. This design facilitates lengthening the effective curing area of the present curing device, allowing for the complete cure of all resin composites in a quadrant simultaneously. Furthermore, this creates a much larger effective curing area while maintaining the proper wavelength and beam intensity. In an exemplary embodiment, the four LED lenses are aligned and spaced in such a way as to provide ideal and consistent light beam overlap along the entire length of the curing field.

In an exemplary embodiment of a crown curing light attachment, designed specifically for cementing crowns, the attachment comprises three LED lenses oriented inward in a U-shape. This U-shape orientation allows for all three traditionally cured surfaces of a crown procedure to be cured at the same time.

In an exemplary embodiment, the curing system of the present invention further comprises a charging dock station configured for connection to the wand and further comprising receivers for one or more curing light attachment heads. In an exemplary embodiment, the charging dock station connects to a power source and is configured for recharging the battery(ies) of the handheld wand of the present curing device. In some embodiments, the dock station curing light attachment head receivers are magnetic.

In use, the present curing device greatly reduces the time spent curing resin composite fillings, resin cemented crowns, orthodontic brackets, and/or other curable resins and further provides a greater field of cure, thus, reducing the risk of under curing resins.

The foregoing and other objects are intended to be illustrative of the invention and are not meant in a limiting sense. Many possible embodiments of the invention may be made and will be readily evident upon a study of this specification and accompanying drawings comprising a part thereof. Specific structural and functional details disclosed herein are not to be interpreted as limiting, but merely as a basis for the claims and as a representative basis for teaching one skilled in the art to variously employ the present invention in virtually any appropriately detailed structure. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Embodiments of the present invention are described in detail below with reference to the attached drawing figures, wherein.

Figure 1:
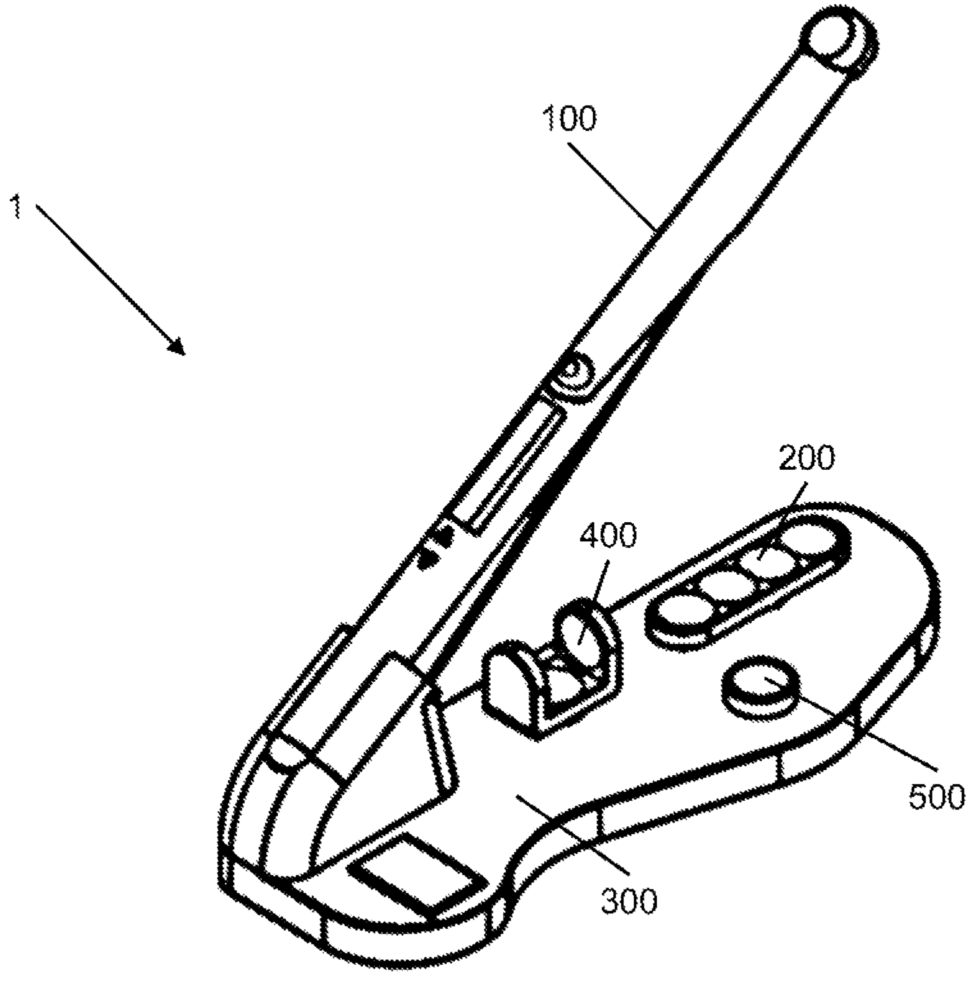
FIG. 1 shows an upper, perspective view of a curing system embodying the present invention.

The drawing figures do not limit the present invention to the specific embodiments disclosed and described herein. The drawings are not necessarily to scale, emphasis instead being placed upon illustrating the principles of the invention.

DETAILED DESCRIPTION OF THE PREFERRED EMBODIMENTS

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention comprises a curing system and methods of use thereof. In an exemplary embodiment the curing system of the present invention includes a handheld wand device and one or more selectively attachable curing light attachment pieces. In a preferred embodiment, the curing system is configured such that each curing light attachment piece can be positioned in relation to the handheld wand device in multiple selective rotational positions about an axis substantially perpendicular to the longitudinal length of the wand device. In other embodiments, the curing light attachment pieces are each configured for connection to the handheld wand device in one position. In alternative embodiments, the handheld wand and curing light portion of the curing system are permanently affixed to each other to form one handheld device. In some such alternative embodiments, the handheld device is configured to accommodate rotational adjustment of the curing light portion of the device. In other such alternative embodiments, the curing light portion is in a fixed position relative to the wand. In an exemplary embodiment, the curing system of the present invention further includes a charging dock station.

In an exemplary embodiment, the curing system 1 of the present invention is configured to provide and direct a light beam of a desired wavelength and intensity in a desired direction for effective and efficient curing. In embodiments, the curing system 1 provides a curing light of a sufficient wavelength and intensity to cure medical grade resins. In an exemplary embodiment, the curing system of the present invention provides a light beam sufficient for curing dental resin composites, such as but not limited to for dental filling procedures. In a preferred embodiment, the curing system of the present invention provides a curing light beam covering a larger surface area than conventional curing lights. In an exemplary embodiment, the light source of the present curing system directs a light beam in a substantially downward and precise direction for effective and efficient curing. In embodiments, the present curing system allows for curing resin composites on four or five posterior teeth at once, which accommodates effective use in accordance with modern quadrant dentistry practices.

Figure 2:
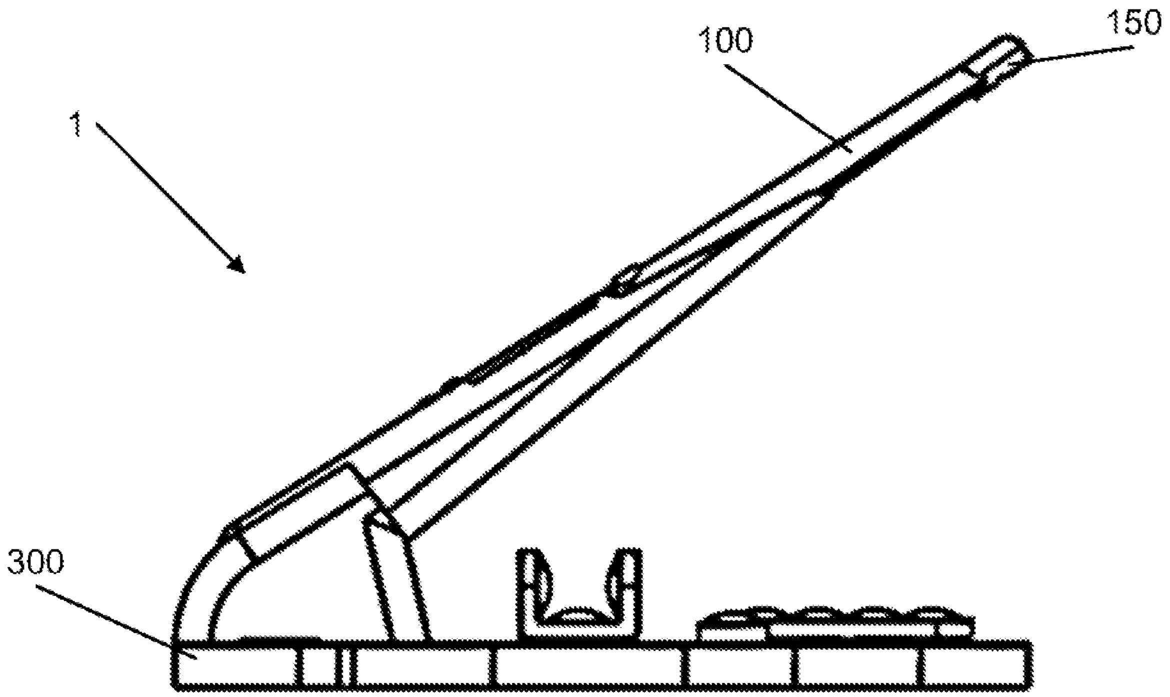
FIG. 2 shows a side, elevational view of the curing system.
Figure 3:
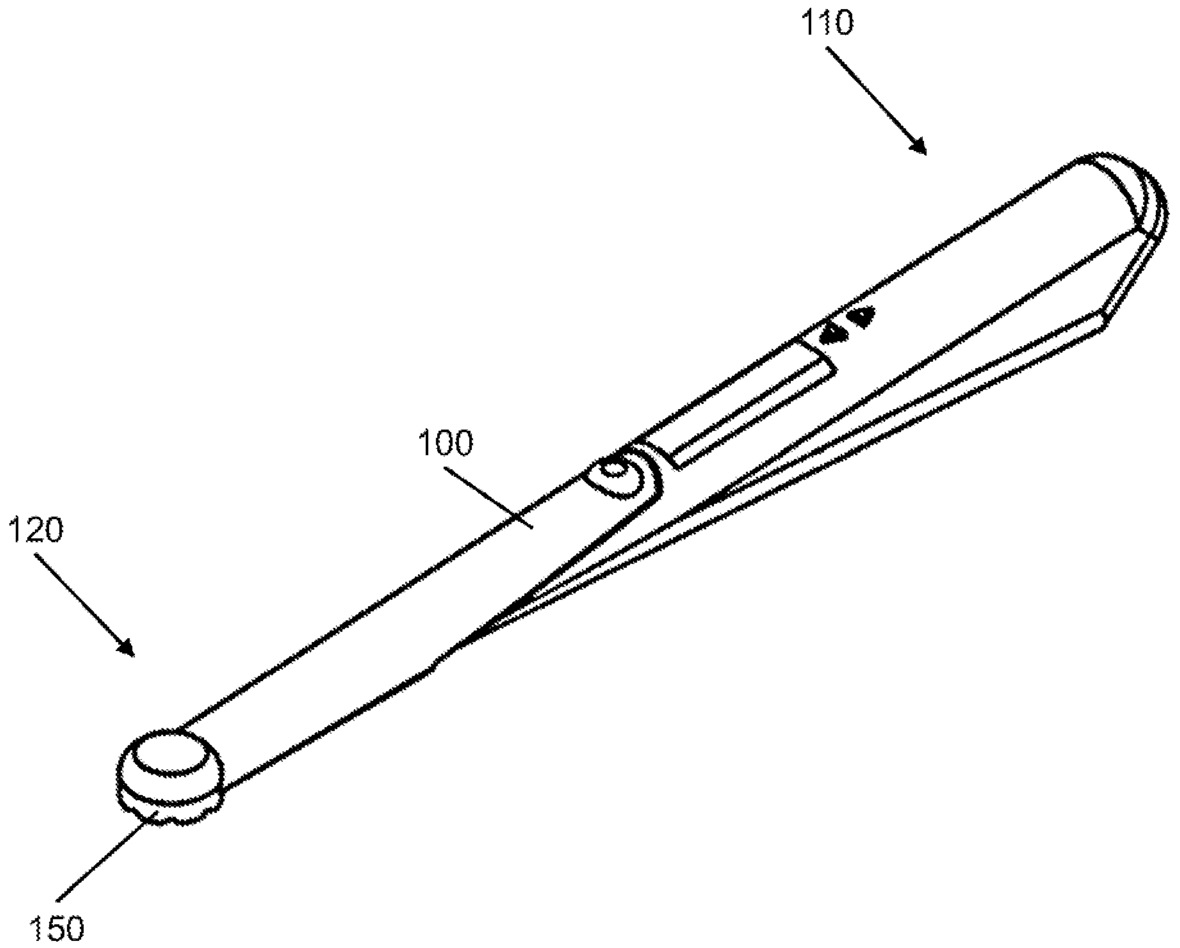
FIG. 3 shows an upper, front, perspective view of a handheld wand device of the curing system.
Figure 4:
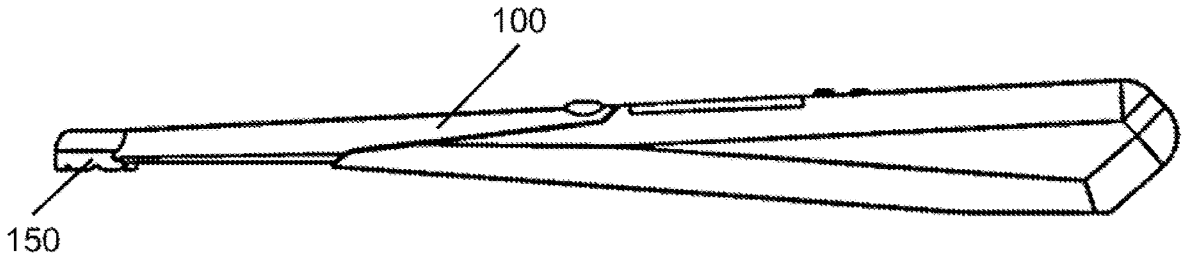
FIG. 4 shows a side, elevational view of the handheld wand.
Figure 5:
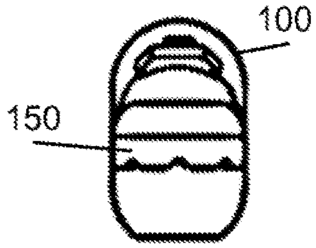
FIG. 5 shows, a distal end, elevational view of the handheld wand.
Figure 6:
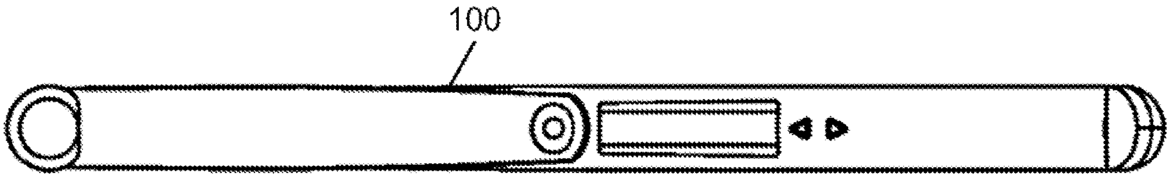
FIG. 6 shows a top, plan view of the handheld wand.
Figure 7:
FIG. 7 shows a bottom, plan view of the handheld wand.
Figure 8:
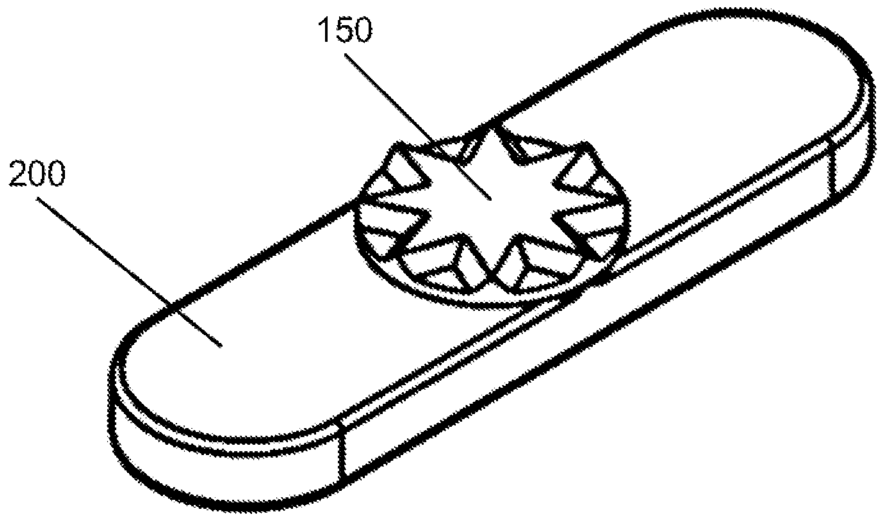
FIG. 8 shows an upper, perspective view of a quadrant curing light attachment of the curing system.
Figure 9:
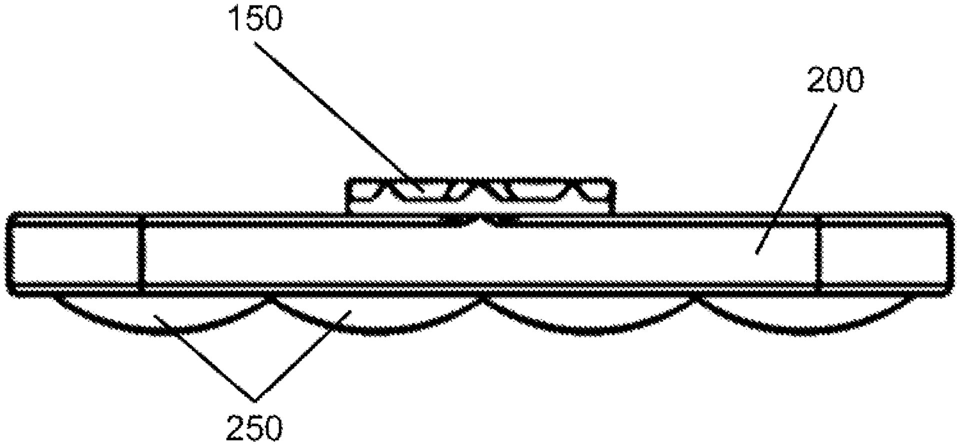
FIG. 9 shows a side, elevational view of the quadrant curing light attachment.
Figure 10:
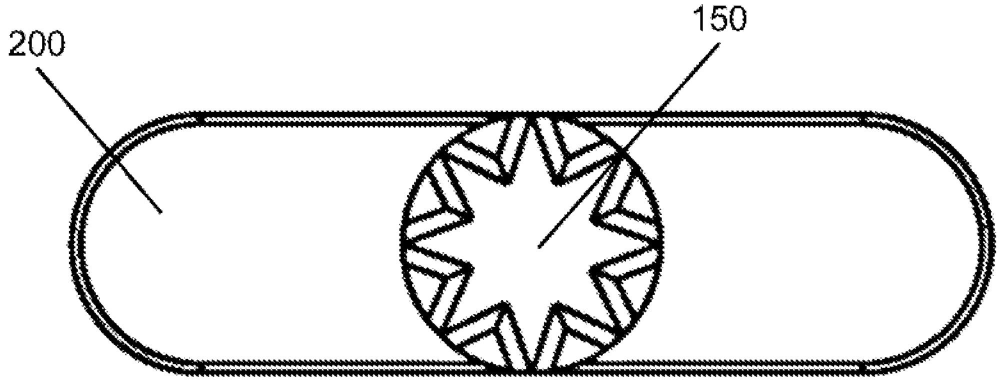
FIG. 10 shows a top, plan view of the quadrant curing light attachment.
Figure 11:
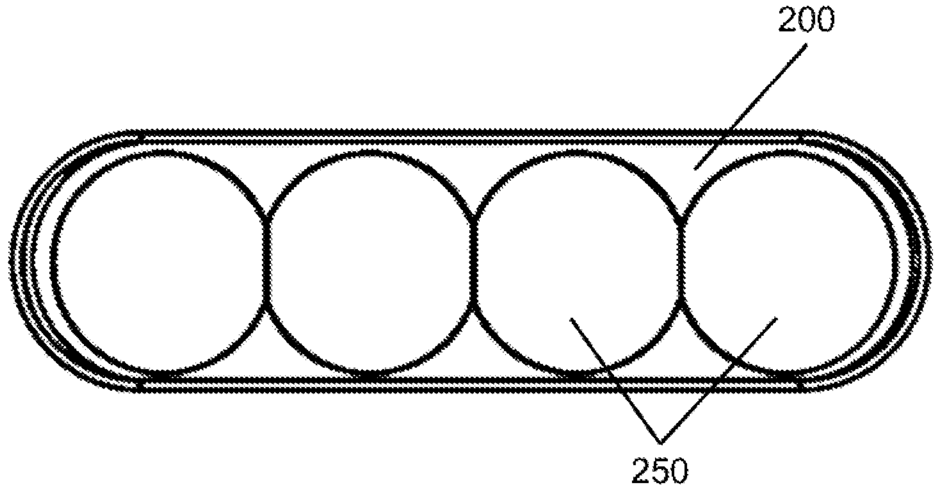
FIG. 11 shows a bottom, plan view of the quadrant curing light attachment.
Figure 12:
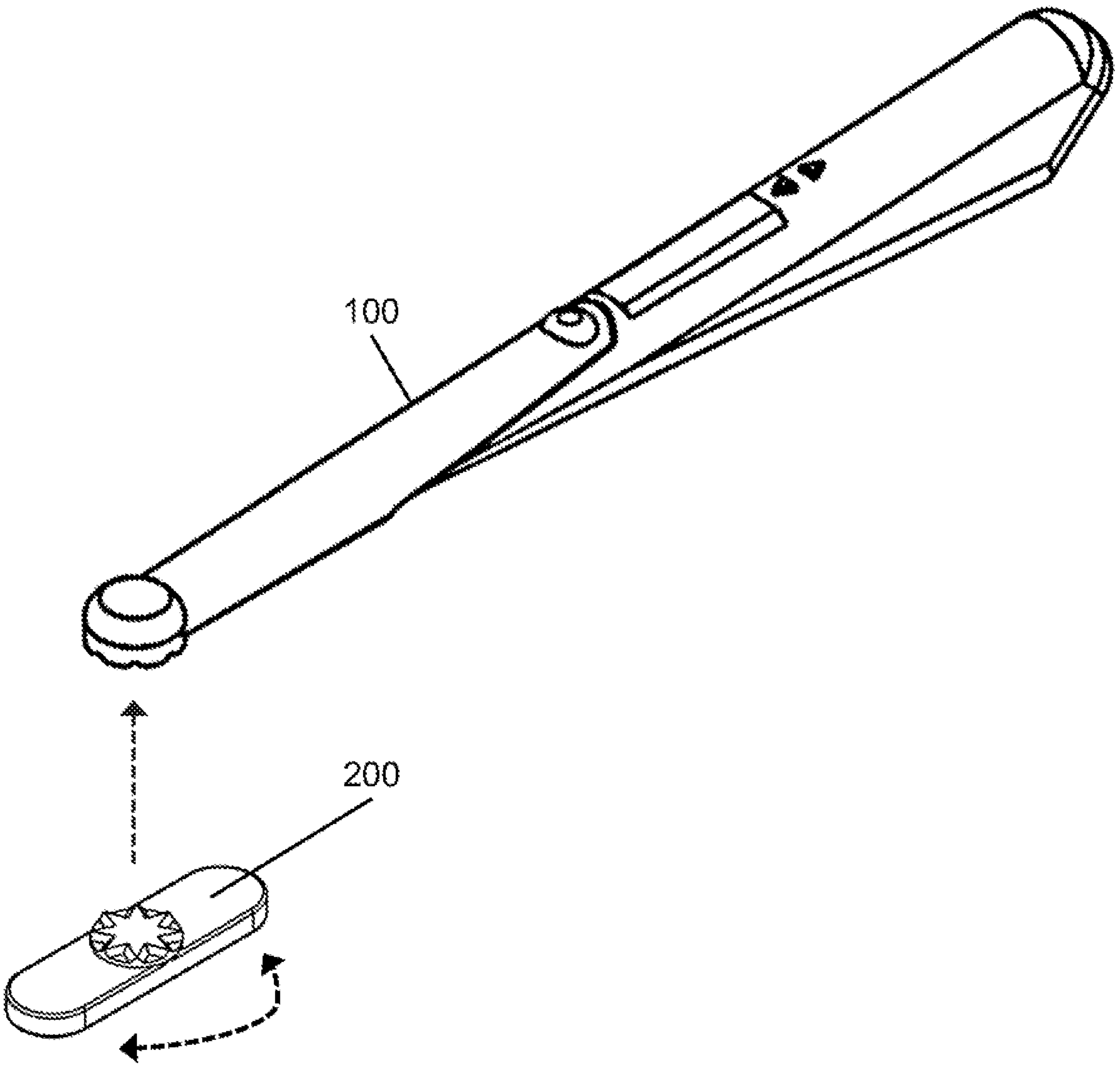
FIG. 12 shows an upper, perspective view of the handheld wand and the quadrant curing light attachment disassembled and illustrating selective connection of the quadrant curing light attachment to the handheld wand and the rotational connection capabilities of the curing system with a plurality of engagement positions about a rotational axis through the center of power transferable, magnetic connectors.
Figure 13:
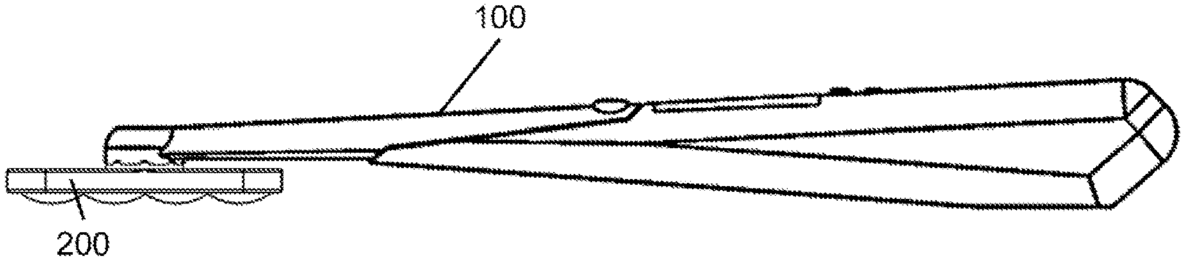
FIG. 13 shows a side, elevational view of the handheld wand device with an assembled quadrant curing light attachment.
Figure 14:
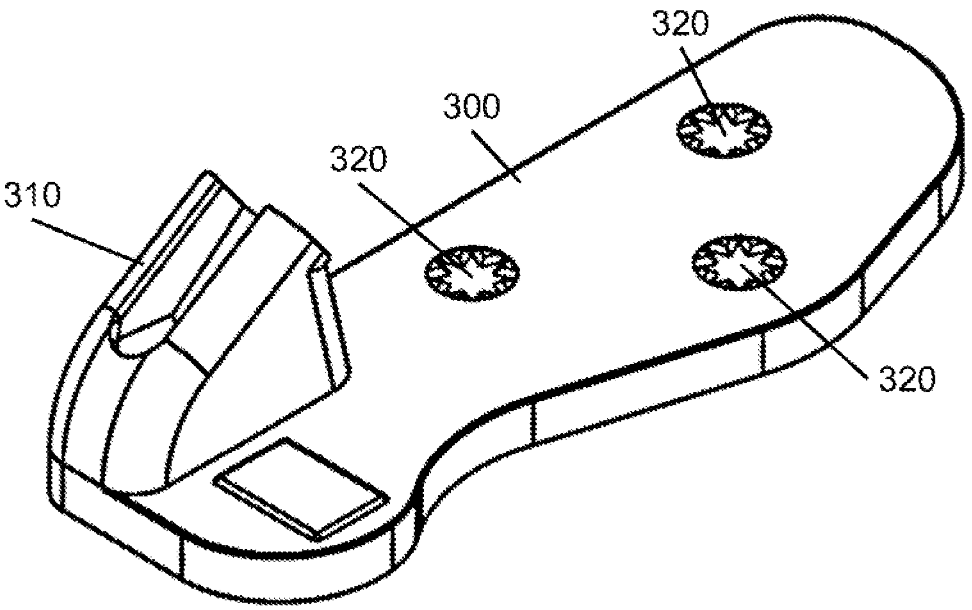
FIG. 14 shows an upper, perspective view of a dock station of the curing system.
Figure 15:
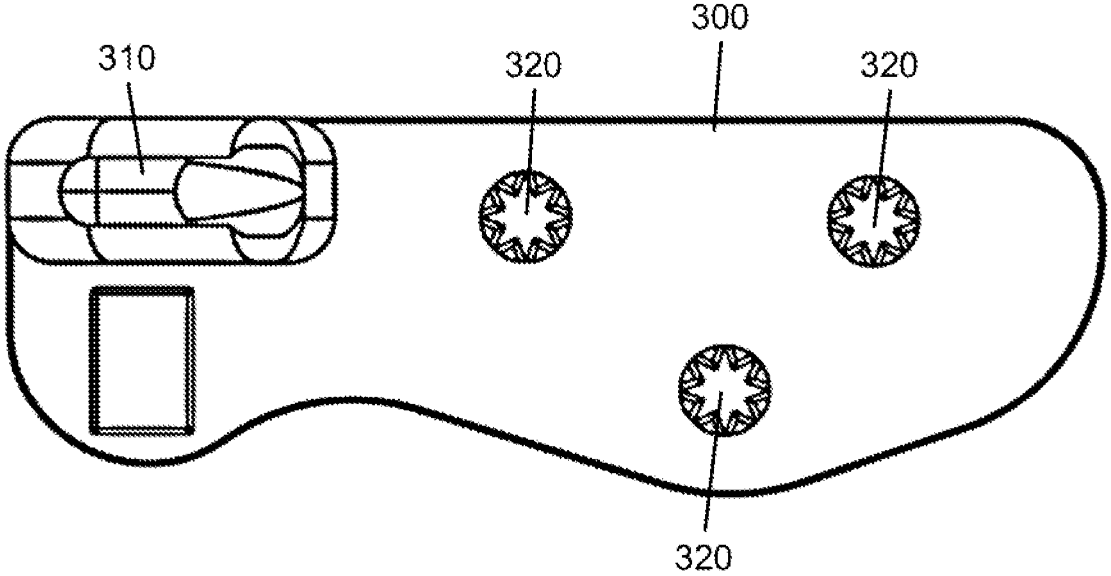
FIG. 15 shows a top, plan view of the dock station.
Figure 16:
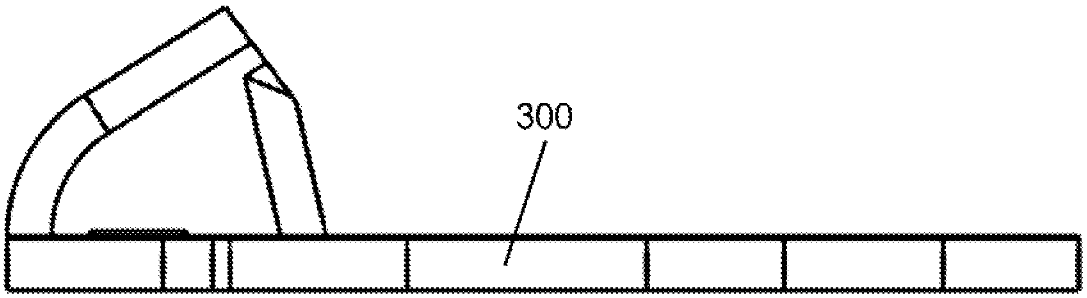
FIG. 16 shows a side, elevational view of the dock station.
Figure 17:
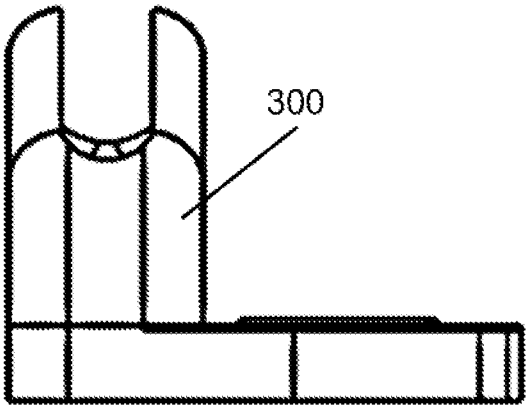
FIG. 17 shows an end, elevational view of the dock station.
Figure 18:
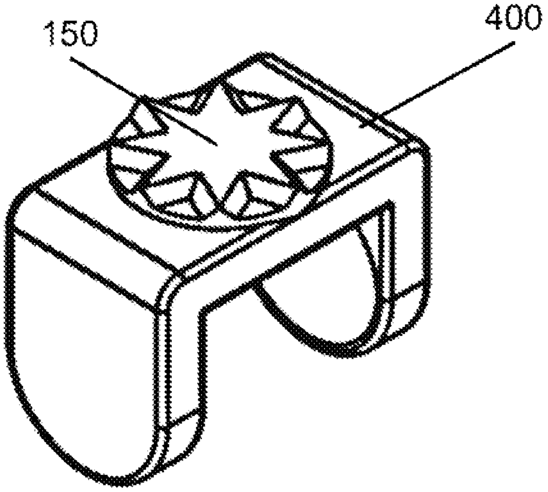
FIG. 18 shows an upper, perspective view of a crown curing light attachment of the curing system.
Figure 19:
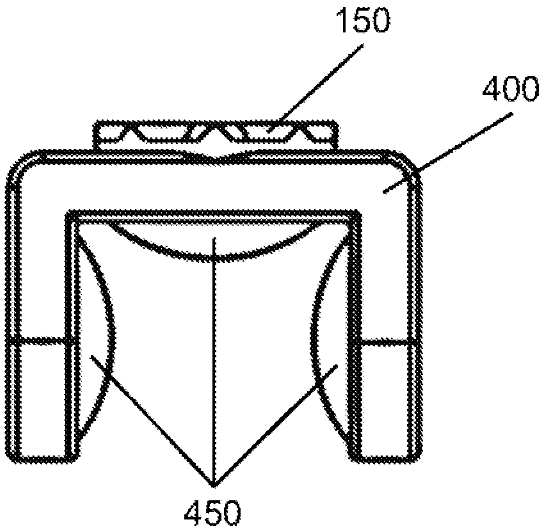
FIG. 19 shows a side, elevational view of the crown curing light attachment.
Figure 20:
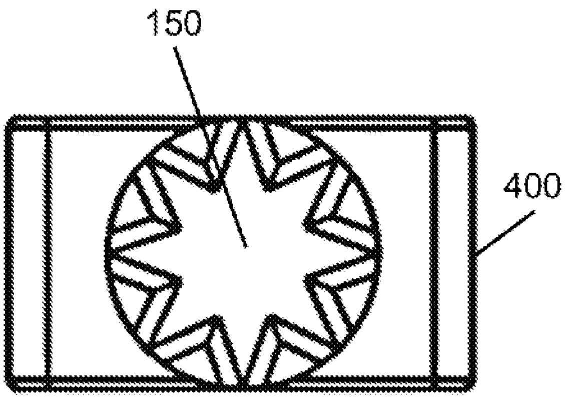
FIG. 20 shows a top, plan view of the crown curing light attachment.
Figure 21:
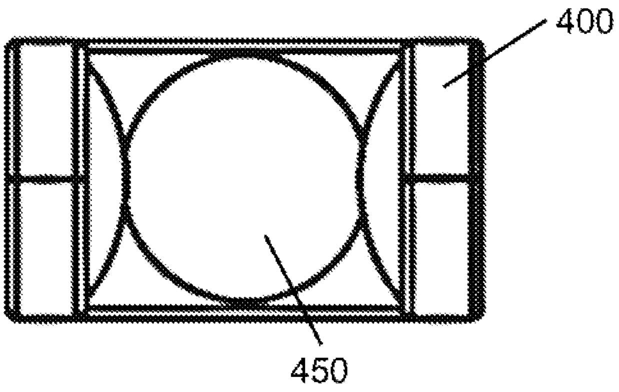
FIG. 21 shows a bottom, plan view of the crown curing light attachment.
Figure 22:
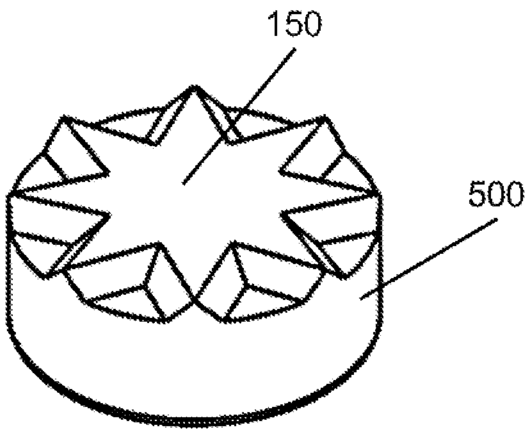
FIG. 22 shows an upper, perspective view of a single curing light attachment of the curing system.
Figure 23:
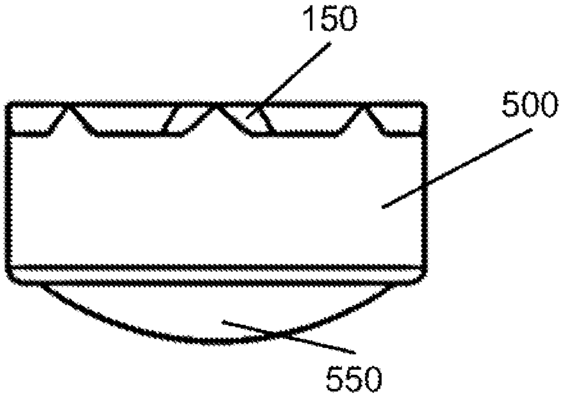
FIG. 23 shows a side, elevational view of the single curing light attachment.
Figure 24:
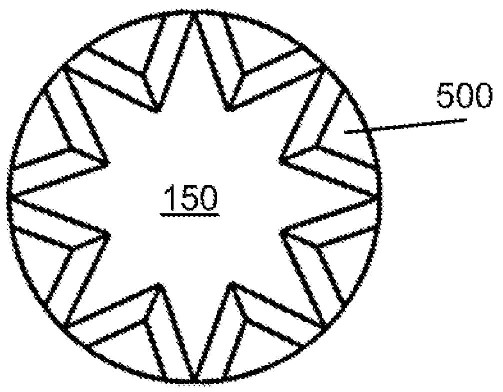
FIG. 24 shows a top, plan view of the single curing light attachment.
Figure 25:
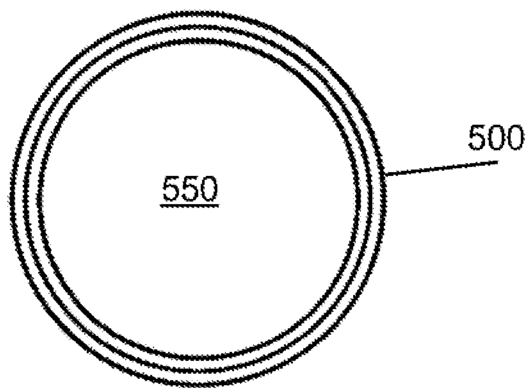
FIG. 25 shows a bottom, plan view of the single curing light attachment.

Referring to the drawings in more detail, FIGS. 1-25 show an exemplary embodiment of a curing system 1 of the present invention. In this embodiment, the curing system 1 includes an elongated handheld wand 100 having a proximal, handle end 110 opposite a distal, curing end 120, as shown in FIGS. 1-7 and 12-13. In an embodiment, the elongated wand 100 further includes a power button positioned along the length of the wand between the proximal 110 and distal ends 120 and configured for turning on and off power to the curing end. In some embodiments the handheld wand 100 further includes one or more adjustment buttons and/or a display screen. In some embodiments, the wand 100 includes an internal microprocessor programmed for controlling parameters of the curing system 1, such as but not limited to light intensity and/or illumination time, adjustable by a user via the adjustable button(s) and/or display.

In an exemplary embodiment, the proximal, handle end 110 of the wand 100 is wider than and narrows toward the curing end 120, as shown in FIGS. 1-7 and 12-13, for comfortable, ergonomic fit for a user's hand. In alternative embodiments, the wand handle end comprises another ergonomic shape, such as but not limited to having one or more finger receivers. In further embodiments, the wand comprises the same general width or thickness from proximal end to distal end or comprises any alternative shape.

In an exemplary embodiment of the present invention, the handheld wand device 100 includes one or more rechargeable batteries for supplying power to one or more curing lights. Alternatively, the wand utilizes one or more replaceable, disposable batteries. In other embodiments, the wand includes a wired connection to a power source. In embodiments having one or more rechargeable batteries, some embodiments further comprise a charging connector, which is preferably positioned near the handle end. In an exemplary embodiment, the body of the handheld wand 100 is made of a rigid material which is easily sterilizable, such as but not limited to rigid plastics.

In an exemplary embodiment, the distal, curing end 120 of the wand 100 comprises a power transferable magnetic connector 150 positioned in an orientation substantially perpendicular to the longitudinal length of the wand 100. In an exemplary embodiment, the connector 150 comprises a female, 8-point star or "octagram" shape receiver configured for magnetic, power transferable connection to a curing light attachment having a corresponding male, octagram shape. In an alternative embodiment, the wand connector 150 comprises a male octagram shape and the curing light attachment connector 150 comprises a corresponding female, octagram shape. In an exemplary embodiment, the magnetic, 8-point star or octagram shape allows a curing light attachment of the present curing system 1 to be rotated 360-degrees, in 45-degree increments, as desired by a user for optimal curing light beam positioning during a curing procedure, as further illustrated in FIG. 12. In other embodiments, the curing system wand piece and curing light attachment connectors 150 include an alternate shape having eight rotational connection positions. If further embodiments, the wand and curing light attachment connectors include two, three, four, five, six, seven, nine, 10, 11, 12, 13, 14, 15, 16, or any other number of rotational adjustment positions.

In an exemplary embodiment, the curing device 1 of the present invention includes multiple, selectively deployable curing light attachment pieces. In an exemplary embodiment, the present curing system 1 comprises one or more light source selectively connected to a power source and configured for directing light through one or more lenses to produce a light beam configured for curing resins. In exemplary embodiments, the curing light attachment pieces of the present invention comprise one or more light-emitting diode (LED) collimating lenses. In alternative embodiments, the curing light attachment pieces comprise one or more focused LED lenses, quartz-tungsten-halogen (QTH) units, plasma arch curing (PAC) units, Argon laser units, or any other type of curing unit(s).

In exemplary embodiments, the handheld wand 100 is configured to selectively supply power, either from housed battery(ies) or a direct wired connection to a power source, to the magnetic, power transferable connector 150 at the wand curing end 120. In an embodiment, such power supply can be switched on and off by a user with a user-activated switch, button, lever, or the like. When the switch is turned on, the magnetic, power transferable connector 150 on the wand curing end 120 transfers power to the connector 150 on an attached curing light attachment. Such connector 150 is further configured to supply power electrically to the light source, which illuminates the curing light beam of the curing system.

In an embodiment, the curing device includes a quadrant curing light attachment 200, as shown in FIGS. 8-13. In a further embodiment, the curing device includes a crown curing light attachment 400, as shown in FIGS. 18-21. In another embodiment, the curing device includes a single curing light attachment 500, as shown in FIGS. 22-25. In further yet embodiments, additional variations of curing light attachments are utilized, such as but not limited to double, triple, five-light, or six-light curing light attachments in any arrangement.

In an exemplary embodiment of a quadrant curing light attachment 200 of the present invention, a single attachment comprising four connected light-emitting diode (LED) collimating lenses 250 is utilized. In an exemplary embodiment, the four LED lenses 250 are positioned in line such that the beam emitted from each overlaps to produce one large curing light beam. In an exemplary embodiment, each lens 250 of the four connected lenses has a diameter of 12 mm. In other embodiments, each lens of the four connected lenses has a diameter of 13 mm, 14 mm, 15 mm, 16 mm, at least 12 mm, at least 13 mm, at least 14 mm, at least 15 mm, or at least 16 mm. Such design facilitates lengthening the effective curing area of the present curing device, allowing for the complete cure of all resin composites within a quadrant simultaneously. Furthermore, the quadrant curing light 200 creates a much larger effective curing area while maintaining the proper wavelength and beam intensity. In an embodiment, the quadrant attachment 200 includes an LED housing which contains separate light sources for each of the 4 collimating lenses. In an exemplary embodiment, the LED light sources can be turned on and off separately, as desired, to accommodate the clinician's specific needs. In an exemplary embodiment, the four LED lenses are aligned and spaced in such a way as to provide ideal and consistent light beam overlap along the entire length of the curing field.

In an exemplary embodiment of a crown curing light attachment 400, configured specifically for cementing crowns, the attachment comprises three LED lenses 450 oriented inward in substantially an upside-down U-shape. In an exemplary embodiment, each lens 450 is 12 mm in diameter. In other embodiments, each lens of the four connected lenses has a diameter of 13 mm, 14 mm, 15 mm, 16 mm, at least 12 mm, at least 13 mm, at least 14 mm, at least 15 mm, or at least 16 mm. The upside-down U-shape orientation of the present crown curing light attachment allows for all three traditionally cured surfaces of a crown procedure to be cured at the same time.

In an exemplary embodiment of a single curing light attachment 500, as shown in FIGS. 22-25, the attachment comprises a single lens 550 which is 12 mm in diameter. In other embodiments, each lens of the four connected lenses has a diameter of 13 mm, 14 mm, 15 mm, 16 mm, at least 12 mm, at least 13 mm, at least 14 mm, at least 15 mm, or at least 16 mm.

In an exemplary embodiment, the curing system of the present invention further comprises a charging dock station 300 including a wand receiver 310 configured for receiving and connection to the handheld wand 100 and further comprising receivers 320 for one or more curing light attachment heads. In an exemplary embodiment, the charging dock station 300 connects to a power source and is configured for recharging the battery(ies) of the handheld wand 100 of the present curing device 1 when the wand 100 is connected. In some embodiments, the dock station wand receiver 310 and/or curing light attachment head receivers 320 are magnetic. In some embodiments, the charging dock station 300 is configured for wired connection to a power source. In other embodiments, the charging dock station 300 includes its own rechargeable or replaceable battery(ies).

In an exemplary embodiment, the curing system 1 is configured for producing light waves having a wavelength between 350-550 nm. In further embodiments, the curing system 1 is configured for producing light waves having a wavelength between 350-700 nm, between 400-500 nm, about 350 nm, about 375 nm, about 400 nm, about 425 nm, about 450 nm, about 475 nm, about 500 nm, about 525 nm, or about 550 nm.

In an exemplary embodiment, the curing system 1 is configured for producing light having an intensity between 1,000-4,000 mW/cm$^2$. In another exemplary embodiment, the curing system 1 is configured for producing light having an intensity between 250-5,000 mW/cm$^2$. Nevertheless, embodiments of the present invention include produced light waves having any wavelength and intensity.

In use, the present curing system 1 greatly reduces the time spent curing resin composite fillings, resin cemented crowns, orthodontic brackets, and/or other curable resins and further provides a greater field of cure, thus, reducing the risk of under curing resins. For example, using the typical case of conducting three to six fillings in a single arch, a full and proper cure could be achieved with the present invention in only three to six cures totaling only 50-100 seconds rather than a typical 150-300 seconds required. This is 66.7% more efficient for general restorative dentists. For orthodontists placing brackets, assuming there are 28 teeth, curing brackets with the present curing system could reasonably be accomplished in six 30-second cures for a total of three minutes as opposed to the 14 minutes of cure time typically needed with current technological limitations. This is 78.6% more efficient. The time saved with use of the present invention is drastic, and such saved time directly translates to higher production for a dentist and more convenience for the patient.

Moreover, with a larger effective curing area provided by the present curing system, there is a lesser chance of clinician error in achieving the proper distance and position of curing light beam and in maintaining such for the proper duration of time. Thus, the present invention results in faster, higher quality dental and orthodontic procedures and more productive clinicians.

Certain terminology is used in the description for convenience in reference only and will not be limiting. For example, up, down, front, back, right, and left refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. Said terminology shall include the words specifically mentioned, derivatives thereof, and words of similar meaning.

As used in this specification and the appended claims, the singular forms "a", "an", and "the" include plural references unless the context clearly dictates otherwise. Thus, for example, a reference to "a method" includes one or more methods, elements, and/or steps of the type described herein and/or which will become apparent to those persons skilled in the art upon reading this disclosure and so forth.

As used in this specification and the appended claims, the use of the term "about" means a range of values including and within 15% above and below the named value, except for nominal temperature. For example, the phrase "about 3 mM" means within 15% of 3 mM, or 2.55-3.45, inclusive. Likewise, the phrase "about 3 millimeters (mm)" means 2.55 mm-3.45 mm, inclusive. When temperature is used to denote change, the term "about" means a range of values including and within 15% above and below the named value. For example, "about 5 °C," when used to denote a change such as in "a thermal resolution of better than 5 °C across 3 mm," means within 15% of 5 °C, or 4.25 °C-5.75 °C. When referring to nominal temperature, such as "about −50 °C to about +50 °C," the term "about" means±5 °C. Thus, for example, the phrase "about 37 °C " means 32 °C-42 °C.

Unless defined otherwise, all technical and scientific terms used herein have the same meaning as commonly understood by one of ordinary skill in the art to which this invention belongs. Although any systems, elements, methods and materials similar or equivalent to those described herein can be used in the practice or testing of the present invention, the preferred systems, elements, and methods and materials are now described. All publications mentioned herein are incorporated herein by reference to describe in their entirety.

"Substantially" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder. "Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

It is also to be understood that the following claims are intended to cover all of the generic and specific features of the invention herein described, and all statements of the scope of the invention which, as a matter of language, might be said to fall therebetween.

Having thus described the invention, what is claimed as new and desired to be secured by Letters Patent is:

1. A curing system comprising:
an elongated wand having a proximal end and a distal end;
said wand proximal end comprising a handle and said wand distal end comprising a first power transferable connector positioned in a direction substantially perpendicular to a longitudinal length of said wand;
a curing light attachment comprising one or more light source and one or more lens configured for producing a curing light beam from said curing light attachment;
said curing light attachment further comprising a second power transferable connector configured for selective engagement with said first power transferable connector;
wherein said first and second power transferable connectors comprise a plurality of engagement positions of said curing light attachment in relation to said wand rotationally about a rotational axis substantially perpendicular to the longitudinal length of said wand; and
wherein said wand is configured for selectively supplying power to said one or more light source of said curing light attachment in an assembled configuration so as to produce said curing light beam in a direction for curing one or more resins.

2. The curing system of claim 1, wherein:
said first and second power transferable connectors comprise power transferable magnets.

3. The curing system of claim 1, wherein:
said plurality of engagement positions comprises eight engagement positions spaced approximately 45-degrees apart rotationally about said rotational axis.

4. The curing system of claim 1, wherein:
said one or more lens comprises one or more collimating lens.

5. The curing system of claim 1, wherein:
said one or more light source and said one or more lens comprise one or more light emitting diode (LED) light source and one or more LED lens.

6. The curing system of claim 1, wherein:
said wand further comprises one or more battery configured for selectively supplying power to said light source.

7. The curing system of claim 6, further comprising:
a dock station comprising a wand receiver and a connection to a power source;
wherein said dock station is configured for charging said one or more battery when said wand is engaged with said wand receiver and said dock station is connected to the power source.

8. The curing system of claim 7, wherein:
said dock station further comprises a curing light attachment receiver configured to receive and retain said curing light attachment.

9. The curing system of claim 1, wherein:
said one or more lens comprises four lenses arranged in line opposite said second power transferable connector.

10. The curing system of claim 1, wherein:
said one or more lens comprises three lenses arranged in an approximate U-shape configured for curing surfaces of a dental crown procedure.

11. The curing system of claim 1, wherein:
said curing light attachment comprises a first curing light attachment comprising four lenses arranged in line opposite said second power transferable connector, a second curing light attachment comprising three lenses arranged in an approximate U-shape configured for curing surfaces of a dental crown procedure, and a third curing light attachment comprising a single lens opposite said second power transferable connector; and
said curing system is configured such that a user selects any one of said first curing light attachment, said second curing light attachment, and said third curing light attachment for engagement with said wand.

12. The curing system of claim 1, wherein:
each of said one or more lens is at least 12 millimeters in diameter.

13. A curing system comprising:
an elongated wand having a proximal end and a distal end;
said wand proximal end comprising a handle and said wand distal end comprising a curing end mounting a curing light feature;
said curing light feature comprising one or more light source and a plurality of lenses configured for producing a curing light beam;

wherein said curing light feature is adjustable rotationally relative to said wand about a rotational axis substantially perpendicular to a longitudinal length of said wand; and wherein said wand is configured for selectively supplying power to said one or more light source so as to produce said curing light beam in a direction for curing multiple resins at one time.

14. The curing system of claim 13, wherein:

said plurality of lenses comprises four lenses arranged in line facing a direction substantially perpendicular to the longitudinal length of said wand.

15. The curing system of claim 13, wherein:

said plurality of lenses comprises three lenses arranged in an approximate U-shape configured for curing surfaces of a dental crown procedure.

16. The curing system of claim 13, wherein:

said curing light feature is detachable from said wand.

17. The curing system of claim 16, wherein:

said wand curing end further comprises a first power transferable connector positioned in a direction substantially perpendicular to a longitudinal length of said wand; and said curing light feature further comprises a second power transferable connector configured for selective engagement with said first power transferable connector.

18. A method of curing one or more resins comprising the steps of:

providing an elongated wand having a proximal end and a distal end, the wand proximal end comprising a handle and the wand distal end comprising a first power transferable connector positioned in a direction substantially perpendicular to a longitudinal length of said wand;

providing a curing light attachment comprising one or more light source, one or more lens, and a second power transferable connector;

wherein the first and second power transferable connectors comprise a plurality of engagement positions of the curing light attachment in relation to said wand rotationally about a rotational axis substantially perpendicular to the longitudinal length of said wand;

aligning said curing light attachment rotationally in a desired position relative to said wand;

connecting said curing light attachment to said wand via said first and second power transferable connectors;

supplying power from said want to said one or more light source;

producing a curing light beam from said curing light attachment in a desired direction; and curing said one or more resins.

19. The method of claim 18, wherein:

said one or more lens comprises four lenses arranged in line opposite said second power transferable connector.

20. The method of claim 19, wherein:

said curing said one or more resins comprises curing all resins within a quadrant of a patient's mouth.

* * * * *